(12) United States Patent
Jäger et al.

(10) Patent No.: US 12,061,727 B2
(45) Date of Patent: Aug. 13, 2024

(54) METHOD FOR ENSURING THE TRUSTWORTHINESS OF SOURCE CODE

(71) Applicant: UNISCON UNIVERSAL IDENTITY CONTROL GMBH, Munich (DE)

(72) Inventors: Hubert Jäger, Pullach (DE); Jaro Fietz, Rampe (DE)

(73) Assignee: UNISCON UNIVERSAL IDENTITY CONTROL GMBH, Munich (DE)

( * ) Notice: Subject to any disclaimer, the term of this patent is extended or adjusted under 35 U.S.C. 154(b) by 488 days.

(21) Appl. No.: 17/338,941

(22) Filed: Jun. 4, 2021

(65) Prior Publication Data

US 2021/0294921 A1  Sep. 23, 2021

Related U.S. Application Data

(63) Continuation of application No. PCT/EP2019/083134, filed on Nov. 29, 2019.

(30) Foreign Application Priority Data

Dec. 5, 2018  (DE) ..................... 10 2018 131 084.6

(51) Int. Cl.
*G06F 21/64* (2013.01)
*G06F 8/41* (2018.01)
*G06F 8/60* (2018.01)
*H04L 9/08* (2006.01)
*H04L 9/32* (2006.01)

(52) U.S. Cl.
CPC ............... *G06F 21/64* (2013.01); *G06F 8/44* (2013.01); *G06F 8/60* (2013.01); *H04L 9/0861* (2013.01); *H04L 9/0897* (2013.01); *H04L 9/3247* (2013.01)

(58) Field of Classification Search
CPC ..... G06F 21/64; G06F 8/44; G06F 8/60; H04L 9/0861; H04L 9/0897; H04L 9/3247
See application file for complete search history.

(56) References Cited

U.S. PATENT DOCUMENTS

| | | | |
|---|---|---|---|
| 2006/0193475 A1* | 8/2006 | Borke | G06F 21/64 380/285 |
| 2016/0365981 A1* | 12/2016 | Medvinsky | G06F 21/57 |
| 2021/0105136 A1* | 4/2021 | Jäger | H04L 9/085 |

FOREIGN PATENT DOCUMENTS

| | | |
|---|---|---|
| DE | 103 36 148 A1 | 3/2005 |
| SG | 186515 A1 | 1/2013 |
| WO | WO-2005025128 A1 * 3/2005 | ............. G06F 21/64 |

OTHER PUBLICATIONS

International Search Report issued for corresponding International Application No. PCT/EP2019/083134 dated Jan. 31, 2020.

* cited by examiner

*Primary Examiner* — Abiy Getachew
(74) *Attorney, Agent, or Firm* — Myers Wolin, LLC

(57) ABSTRACT

A method for ensuring the trustworthiness of software source code (source code) is provided, wherein two software developers sign the source code produced by said software developers. A compiling device checks, on the basis of the public signature keys of the software developers, whether the source code is trustworthy and produces a binary code from the source code. The produced binary code is signed by the compiling device, and the signed binary code together with the public signature key of the compiling device is made available for further use. The signed binary code is therefore likewise trustworthy.

3 Claims, 1 Drawing Sheet

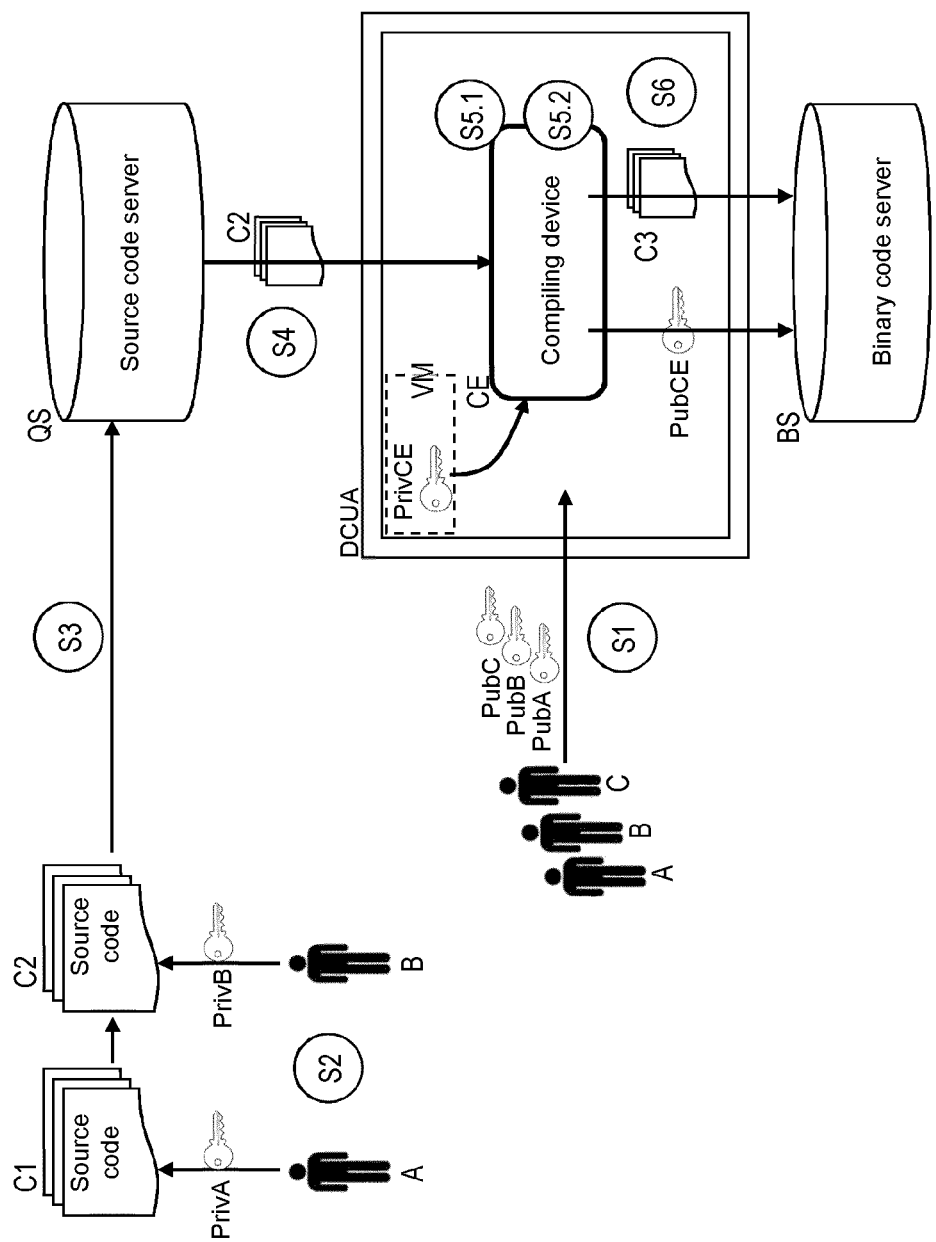

METHOD FOR ENSURING THE TRUSTWORTHINESS OF SOURCE CODE

CROSS REFERENCE TO RELATED APPLICATIONS

This application is a continuation of International Application No. PCT/EP2019/083134, filed on Nov. 29, 2019, which takes priority from German Patent Application No. 10 2018 131 084.6, filed Dec. 5, 2018, the contents of each of which are incorporated by reference herein.

TECHNICAL FIELD

The invention relates to a method for ensuring the trustworthiness of software source code (hereinafter referred to simply as source code) with which a trustworthy executable code (binary code) can be provided.

BACKGROUND

Trustworthy source code means code that does not contain any component portions or code portions that do not correspond to the specified purpose of the software to be created and that could jeopardize the security of the data in this software or other software executed on the same computer infrastructure. Untrustworthy parts of the code (source code) can arise or be smuggled in by mistake or with willful malice. If an executable program is produced from the source code which comprises untrustworthy parts, the executable program is also to be classified as untrustworthy.

One method of ensuring the trustworthiness of source codes is to sensitize and train software developers to pay attention to security when writing the source code. However, this cannot ensure that untrustworthy source code portions will be produced.

One method of further increasing the trustworthiness of source codes is so-called "pair programming." Pair programming means that two (or more) programmers always work together on one computer when creating the source code. The first programmer writes the source code, while the second programmer checks the written source code and immediately addresses any problems that occur to him. These problems can then be solved immediately by the two programmers discussing them. It has proven to be beneficial if the two programmers frequently alternate their roles. The composition of the pairs should also be changed frequently in order to further increase the trustworthiness of the source code. Malicious action by one programmer is largely prevented by the checking of the other programmer.

With the aforementioned measures, however, it cannot be ruled out that a non-trustworthy executable program is produced from an inherently trustworthy source code. This is because the source code can be changed between the completion of the source code and the generation of the executable program, for example, by unauthorized third parties. Such a subsequent change in the source code can add untrustworthy source code portions or originally trustworthy source code portions can be changed in such a way that they are subsequently untrustworthy.

An object of the present invention is therefore to ensure the trustworthiness of source codes in such a way that, on the one hand, the source code remains trustworthy until the executable program is produced, and, on the other hand, it is ensured that the executable software was produced from a trustworthy source code.

SUMMARY

This object is achieved by a method for ensuring the trustworthiness of software source code (source code). Advantageous embodiments and further developments of the invention are specified in the dependent claims. Accordingly, a method for ensuring the trustworthiness of software source code (source code) is provided, wherein at least a first software developer and a second software developer are registered for programming the source code, wherein data assigned to the respective software developers are imported into a secure infrastructure together with a public signature key belonging to the respective software developer, the first software developer signs the source code created by him with his private signature key and the second software developer signs the source code signed by the first software developer with his private signature key, the source code signed by both software developers is stored in a source code server, a compiling device arranged in the secure infrastructure imports the signed source code from the source code server into the secure infrastructure, checks whether the imported source code has been signed with private signature keys that are associated with the imported public signature keys, and translates the imported source code into executable binary code, and the compiling device signs the binary code and exports the signed binary code to a binary code server outside the secure infrastructure and makes it available there for further use.

This ensures the trustworthiness of the source code from the creation of the source code to the generation of the binary code. It is also ensured that the binary code is produced in a trustworthy manner. This also ensures the trustworthiness of the produced binary code.

It is advantageous if the second software developer signs the source code signed by the first software developer after he has checked the source code.

It is also advantageous if the first software developer signs the source code created by him after the second software developer has checked the source code.

The compiling device can sign the binary code with a private signature key assigned to the compiling device and export the signed binary code together with the public key belonging to the private signature key to the binary code server.

It is advantageous if the private signature key assigned to the compiling device is stored exclusively in the secure infrastructure.

It is particularly advantageous if the private signature key assigned to the compiling device is stored exclusively in a volatile memory device of the secure infrastructure.

It is also advantageous if the private signature key assigned to the compiling device and the public key belonging to this private signature key are produced exclusively within the secure infrastructure.

A sensor device of the secure infrastructure can continuously monitor accesses to the secure infrastructure and, if unauthorized access is detected, at least delete the private signature key assigned to the compiling device.

After the private signature key assigned to the compiling device has been deleted, a new private signature key assigned to the compiling device and a new public key belonging to the new private signature key can be produced.

BRIEF DESCRIPTION OF THE DRAWINGS

Details and features of the invention and specific embodiments of the invention emerge from the following description in conjunction with the drawing, wherein FIG. 1 shows a block diagram of an infrastructure for ensuring the trustworthiness of source code with which the method according to the invention for ensuring the trustworthiness of source code is simultaneously explained in more detail.

DETAILED DESCRIPTION

With reference to FIG. 1, a method for ensuring the trustworthiness of source code is described in which two software developers A, B create a source code from which an executable program (also called binary code below) is then produced. However, the method can be used not just with two software developers. In one embodiment of the invention, a plurality of pairs of software developers can also create different source code portions, wherein a trustworthy executable program (binary code) is produced from the plurality of different source code portions.

With the method, it can be documented automatically and in a non-disputable manner which software developers have produced which source code or source code portions and which software developers are responsible for which source code or for which source code portions. A major advantage of the method is that the trustworthiness of the source code is consistently protected from the creation of the source code by the programmer up until generation of the executable program (binary code) and cannot be impaired by third parties either.

According to the method, software developers A, B, C are first registered and accredited for the development of software (step S1). Furthermore, in step S1 data from the respective software developers A, B, C are imported into a secure infrastructure DCUA. The data can include, for example, the name of the respective software developer. However, importing the data is not a necessary prerequisite for the method according to the invention, so the data of the software developer can be imported only optionally into the secure infrastructure DCUA.

Every software developer has a cryptographic key pair with which the respective software developer can sign the source code he has created or the source code he has checked. The key pair assigned to the respective software developer comprises a public cryptographic signature key and a private cryptographic signature key. In the example shown in FIG. 1, the key pair, consisting of the public signature key PubA and the private signature key PrivA, is assigned to the first software developer A. The key pair, consisting of the public signature key PubB and the private signature key PrivB, is assigned to the second software developer B. A corresponding assignment is also provided for developer C shown in FIG. 1, who, however, is not involved in the creation of source code in the example shown in FIG. 1.

In step S1 the public signature keys PubA, PubB and PubC are imported into the secure infrastructure DCUA for each registered and accredited software developer. The respective associated private signature keys remain with the software developers.

The secure infrastructure DCUA essentially comprises encapsulated zones or segments of a data center, which are protected by special measures. Such measures can be, for example, special rooms with special security doors. In addition, a network of sensors can be provided with which the secure infrastructure is protected so that access is not possible, either physically on site or logically via an electronic interface, without triggering an alarm. External access to the data stored in the secure infrastructure DCUA is only permitted via a few very special interfaces, wherein these interfaces are also monitored with special filters in order to detect attempts at attacks via these few special interfaces.

According to embodiments of the present invention, a compiling device CE is arranged in the secure infrastructure DCUA, with which the source code produced by the software developers can be translated into executable binary code. The compiling device CE is preferably also particularly trustworthy software. According to embodiments of the invention, the compiling device CE arranged in the secure infrastructure DCUA is supplied with the source code components or source code portions to be translated via an interface present in the secure infrastructure DCUA. In an advantageous embodiment of the invention, this interface is designed so that only one source code server QS, in which the source code components to be translated are stored, can communicate with the secure infrastructure DCUA or with the compiling device CE.

The public signature keys PubA to PubC of the software developers A to C that are imported into the secure infrastructure DCUA in the first step S1 can be stored in the secure infrastructure exclusively in a volatile memory device VM. However, these public signature keys can also be stored in a permanent memory device of the secure infrastructure DCUA.

In step S2, a first software developer A signs the source code C1 created by him with his private signature key PrivA. The source code C1 signed by the first software developer A is then signed by the second software developer B with his private signature key PrivB. It is advantageous here if the second software developer B only signs the source code created by the first software developer A after a precise check. For example, the second software developer B can check the source code to determine whether certain programming guidelines have been followed. The source code can also be checked to determine whether it contains code portions that jeopardize the security of the data to be processed or other software. It is advantageous if the second software developer B, when checking the source code produced by the first software developer A, undertakes all measures with which the second software developer B can confirm the trustworthiness of the source code by signing the source code.

If the second software developer B finds untrustworthy code portions, he can request the first software developer A to revise these code portions. The signature produced by the first software developer A would then become invalid, and the first software developer A would then have to sign the source code again with his private signature key PrivA after the revision of the source code. This newly signed source code C1 can then in turn be checked by the second software developer B and then signed with his private signature key PrivB. This procedure can be repeated until the second software developer B is of the opinion that the source code C1 produced and signed by the first software developer A is trustworthy.

The responsibility of the two software developers A and B can be swapped after a predetermined time, i.e., the software developer B then takes over the creation of the source code, and the first software developer A then takes over the checking of the source code.

In an alternative embodiment of the invention, which is not shown in FIG. 1, a third software developer C can also be involved in the process of creating the source code. In this case, the two software developers A and B can create the source code using the so-called "four-eyes principle." The third software developer C then acts as a so-called "committer," who only checks the source code produced by the two software developers A, B and, if the required trustworthiness is present, also signs the source code signed by the two software developers A, B. In this case it can be provided that both software developers A, B sign their jointly created source code with their respective private signature keys PrivA, PrivB. In this case, the signed source code C2 has three signatures.

The generated and signed source code C2 is stored in the source code server QS in step S3. The signed source code C2 can be transmitted to the source code server QS via a secure connection. However, this connection does not necessarily have to be a secure connection, because a change in the source code on the transmission path to the source code server QS would result in the signatures of the source code C2 becoming invalid. The compiling device CE would then recognize that a source code or source code portion to be translated has an invalid signature. In this case, the compiling device CE can refuse to translate the source code or the source code portion.

All source code components or source code portions of software to be produced are stored in the source code server QS, wherein all of the source code components or source code portions belonging to a software producing them were signed by their developers. The above-described method of signing the source code portions can on the one hand ensure that all source code portions of software to be produced are trustworthy. This also means that the software produced by the compiling device CE from these trustworthy source code portions is also trustworthy, provided that an executable program is also produced from the signed source code portions according to the method which is described further below.

To produce the executable program or the binary code from the source code portions stored and signed in the source code server QS, the signed source code portions C2 required for this are loaded into the secure infrastructure DCUA in step S4 and fed there to the compiling device CE for translation.

The compiling device CE first checks in step S5.1 whether the imported source code C2 was signed with a private signature key PrivA, PrivB, which belongs to one of the imported public signature keys PubA, PubB. This verification can be carried out using methods for signature verification known per se from the prior art.

If this check carried out in step S5.1 shows that all of the source code portions C2 required to produce a program have been validly signed, then in step S5.2 the compiling device C3 produces an executable program, for example a binary code, from the imported source code portions C2.

This produced binary code is then a trustworthy binary code or trustworthy software.

In order to also confirm the trustworthiness of the produced binary code or the produced executable software, it is provided that the produced binary code is also signed in the secure infrastructure DCUA. For this purpose, it is provided that the produced binary code is signed with a private signature key PrivCE assigned to the compiling device CE or with a private signature key PrivCE assigned to the secure infrastructure DCUA. It is essential here that this private signature key PrivCE is stored exclusively in a volatile memory device VM within the secure infrastructure DCUA. The advantage of this is described in more detail below.

In step S6, the signed binary code C3 is then exported to a binary code server BS arranged outside the secure infrastructure DCUA and made available there for further use. At the same time, the public signature key PubCE belonging to the private signature key PrivCE is also exported on the binary code server BS and assigned there to the signed binary code C3. Using the exported public signature key PubCE, users of the signed binary code C3 can check whether the binary code was signed with a valid signature key and whether this binary code is therefore a trustworthy binary code.

By only storing the private signature key PrivCE in a volatile memory device VM of the secure infrastructure DCUA, it can be ensured that, after an unauthorized external access to the secure infrastructure DCUA, the private signature key PrivCE is deleted by disconnecting the volatile memory VM from the power supply. At the same time, this also ensures that binary codes that have already been validly signed can still be classified as trustworthy, because at this instant the binary codes were signed with a valid private signature key PrivCE.

After unauthorized access has been detected and the private signature key PrivCE has been deleted from the volatile memory device VM, a new key pair must be produced for signing binary codes. It is provided here that this cryptographic key pair is produced exclusively in the secure infrastructure DCUA and that the private signature key PrivCE of this new key pair is stored exclusively in the volatile memory VM of the secure infrastructure DCUA.

After a new cryptographic key pair has been produced, the binary codes produced by the compiling device CE are signed with the new private signature key PrivCE and exported to the binary code server BS together with the new public signature key PubCE.

If the public signature keys PubA to PubC assigned to the software developers A to C have also been stored in a volatile memory of the secure infrastructure DCUA, these public signature keys must be imported back into the secure infrastructure DCUA after the volatile memory has been disconnected from the power supply (as described in relation to step S1).

The method described above ensures that a binary code is produced from the source code produced by a first software developer A, which binary code can be classified as trustworthy.

What is claimed is:
1. A method for ensuring the trustworthiness of software source code (source code), wherein:
at least a first software developer (A) and a second software developer (B) for programming the source code are registered (S1), wherein data assigned to the respective software developers (A, B) together with a public signature key (PubA, PubB) belonging to the respective software developer are imported into a secure infrastructure (DCUA),
the first software developer (A) signs the source code created by him with his private signature key (PrivA) and the second software developer (B) signs (S2) the source code (C1) signed by the first software developer (A) with his private signature key (PrivB),
the source code (C2) signed by both software developers (A, B) is stored (S3) in a source code server (QS), a compiling device (CE) arranged in the secure infrastructure (DCUA)
  imports (S4) the signed source code (C2) from the source code server (QA) into the secure infrastructure (DCUA),
  checks whether the imported source code has been signed with private signature keys (PrivA, PrivB) belonging (S5.1) to the imported public signature keys (PubA, PubB), and
  translates the imported source code into executable binary code (S5.2),
the compiling device (CE) signs the binary code with a private signature key (PrivCE) assigned to the compiling device and exports the signed binary code (C3) together with the public key (PubCE) belonging to the private signature key (PrivCE) to the binary code server (BS) belonging to the private signature key (PrivCE),
wherein the private signature key (PrivCE) assigned to the compiling device (CE) and the public key (PubCE) belonging to this private signature key (PrivCE) are generated exclusively within the secure infrastructure (DCUA), and
wherein the private signature key (PrivCE) assigned to the compiling device (CE) is stored exclusively in a volatile memory device (VM) of the secure infrastructure (DCUA).

2. The method of claim 1, wherein a sensor device of the secure infrastructure (DCUA) continuously monitors access to the secure infrastructure and upon detection of unauthorized access deletes at least the private signature key (PrivCE) assigned to the compiling device (CE).

3. The method of claim 2, wherein after the private signature key (PrivCE) assigned to the compiling device (CE) has been deleted, a new private signature key (PrivCE') assigned to the compiling device and a new public key (PubCE') belonging to the new private signature key (PrivCE') are generated.

\* \* \* \* \*